United States Patent [19]

Minamoto

[11] Patent Number: 5,747,966

[45] Date of Patent: May 5, 1998

[54] BATTERY CHARGING/DISCHARGING APPARATUS WITH SERIAL BATTERY CONNECTION

[75] Inventor: Yoshiji Minamoto, Kawasaki, Japan

[73] Assignee: Fujitsu Limited, Kanagawa, Japan

[21] Appl. No.: 306,371

[22] Filed: Sep. 15, 1994

[30] Foreign Application Priority Data

Jan. 13, 1994 [JP] Japan .................................. 6-001815

[51] Int. Cl.[6] .................................................. H01M 10/46
[52] U.S. Cl. .................................. 320/6; 320/7; 320/16
[58] Field of Search ............................... 320/6, 7, 8, 15, 320/16; 361/90, 104, 275.4

[56] References Cited

U.S. PATENT DOCUMENTS

| | | | |
|---|---|---|---|
| 4,139,812 | 2/1979 | Huggins | 320/16 X |
| 4,713,597 | 12/1987 | Altmejd | 320/6 X |
| 4,719,401 | 1/1988 | Altmejd | 320/6 X |
| 4,869,975 | 9/1989 | Eppley et al. | 429/7 |
| 5,177,425 | 1/1993 | Goto | 320/6 |

Primary Examiner—Edward Tso
Attorney, Agent, or Firm—Staas & Halsey

[57] ABSTRACT

A battery charging/discharging apparatus has batteries, a charger, diodes and switches. The diodes are respectively connected in parallel with the batteries. The cathode of each diode is connected to the positive side of the corresponding battery and the anode of each diode is connected in the negative side of the corresponding battery. The batteries are discharged in a serial connection. The switches change the connection of the batteries to cause a parallel connection of the batteries to charge the batteries and to cause a serial connection to discharge the batteries. The apparatus can continue the charging/discharging of batteries even when one of the batteries fails.

2 Claims, 4 Drawing Sheets

BATTERY CHARGING/DISCHARGING APPARATUS WITH SERIAL BATTERY CONNECTION

BACKGROUND OF THE INVENTION

The present invention relates to a charging/discharging apparatus for two or more batteries (hereafter referred to as a "battery unit"), for example, for providing battery backup to a load such as memory elements, etc., of a computer.

FIG. 1 is a diagram of a prior art device, including a load 2, a charger 3, a battery unit BUT, batteries B1, B2, B3, diodes D5 and D6 and an input power supply E1. V1 represents a charging voltage.

The input power supply E1 supplies electrical power to the load 2 and also charges the battery unit BUT via the charger 3. A power supply which smooths AC power (AC/DC converter) may be used as the input power supply E1. The load 2 may be, for example, a backup power supply for a personal computer and its memory elements, etc. The charger 3 charges the battery unit BUT and is formed, for example, of a DC/DC converter. The diodes D1, D2 supply electrical power to the load 2 from the battery unit BUT. When the input power supply E1 operates normally, the diodes D1, D2 prevent direct impression of the input power supply E1 on the battery unit BUT. The battery unit BUT includes batteries B1, B2 and B3 connected in series.

First, charging of the battery unit BUT will be explained. When the input power supply E1 is impressed, electrical power is supplied to the load 2 from the input power supply E1 and the batteries B1-B3 in the battery unit are charged to a charging voltage V1 from the input power supply E1 through the charger 3. Charging of the batteries is first carried out by a constant current and is then carried out by a constant voltage after a predetermined time has passed.

Next, discharging of the battery unit BUT will be explained. If the input power supply E1 fails, the electrical power is supplied to the load 2 by the battery unit BUT through the diodes D5, D6.

The prior art has the following disadvantages. Since the batteries B1-B3 of the battery unit BUT are connected in series, if one battery, for example, the battery B2 becomes open, a line from the battery B1 to the battery B3 is disconnected. Therefore, the battery unit BUT cannot charge and discharge.

Further, when a charging voltage of the charger 3 is set to a constant voltage V1 while the batteries are being charged, a voltage of V⅓ is usually impressed on each of the batteries B1, B2, B3. However, if one of the batteries, for example, battery B1, is short-circuited, the voltage V½ is impressed on each of the batteries B1, B2, thereby resulting in an overcharging condition. Therefore, there has been a problem of battery deterioration in the prior art.

SUMMARY OF THE INVENTION

It is an object of the present invention to solve the problems of the prior art explained above.

It is also an object of the present invention to perform charging and discharging of batteries, even if one battery in the battery unit BUT fails.

The present invention is directed to a battery charging/discharging apparatus for a plurality of batteries, including a charger for charging the plurality of batteries, and diodes connected in parallel with the plurality of batteries, with the cathodes of each diode being connected to the positive side of each of the batteries and the anode of each diode being connected to the negative side of each of the batteries, so that the battery charging/discharging apparatus makes the plurality of batteries discharge via a serial connection.

DETAILED DESCRIPTION OF THE PREFERRED EMBODIMENTS

Figure 1:
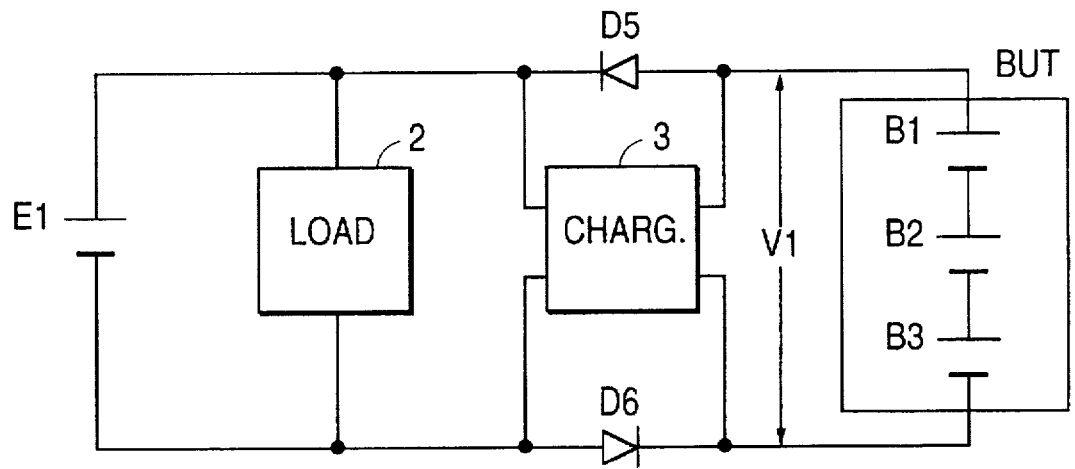
FIG. 1 is a circuit diagram of a prior art charging/discharging apparatus.
Figure 2:
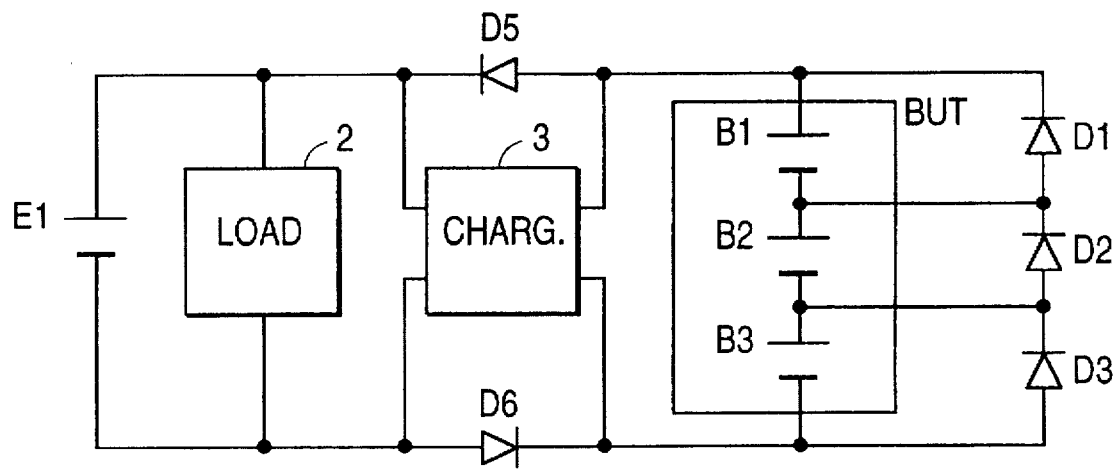
FIG. 2 is a circuit diagram of a battery charging/discharging apparatus in accordance with a first embodiment of the present invention.

Referring to FIG. 2 which is a first embodiment of the present invention, the elements which are the same as those in FIG. 1 are designed by like reference numerals or symbols. D1, D2 and D3 are diodes.

A charger 3 charges batteries B1–B3. Diodes D1–D3 are connected in parallel with the batteries B1–B3, with the cathode of each diode being connected to the positive side of a corresponding one of the batteries and the anode of each diode being connected to the negative side of the corresponding one of the batteries. The batteries B1–B3 are connected in series during discharging.

If one of the batteries, for example, the battery B2 becomes open while the power supply is impressed on the load by the battery unit BUT through the diodes D5 and D6 (that is, during the backup operation), the power supply to the load is carried out from the batteries B1, B3 through the diode D2 and the diodes D5 and D6. Therefore, even if one of the batteries fails during the backup operation, the backup operation can be continued, although the voltage impressed on the load is reduced by an amount corresponding to one battery.

Figure 3:
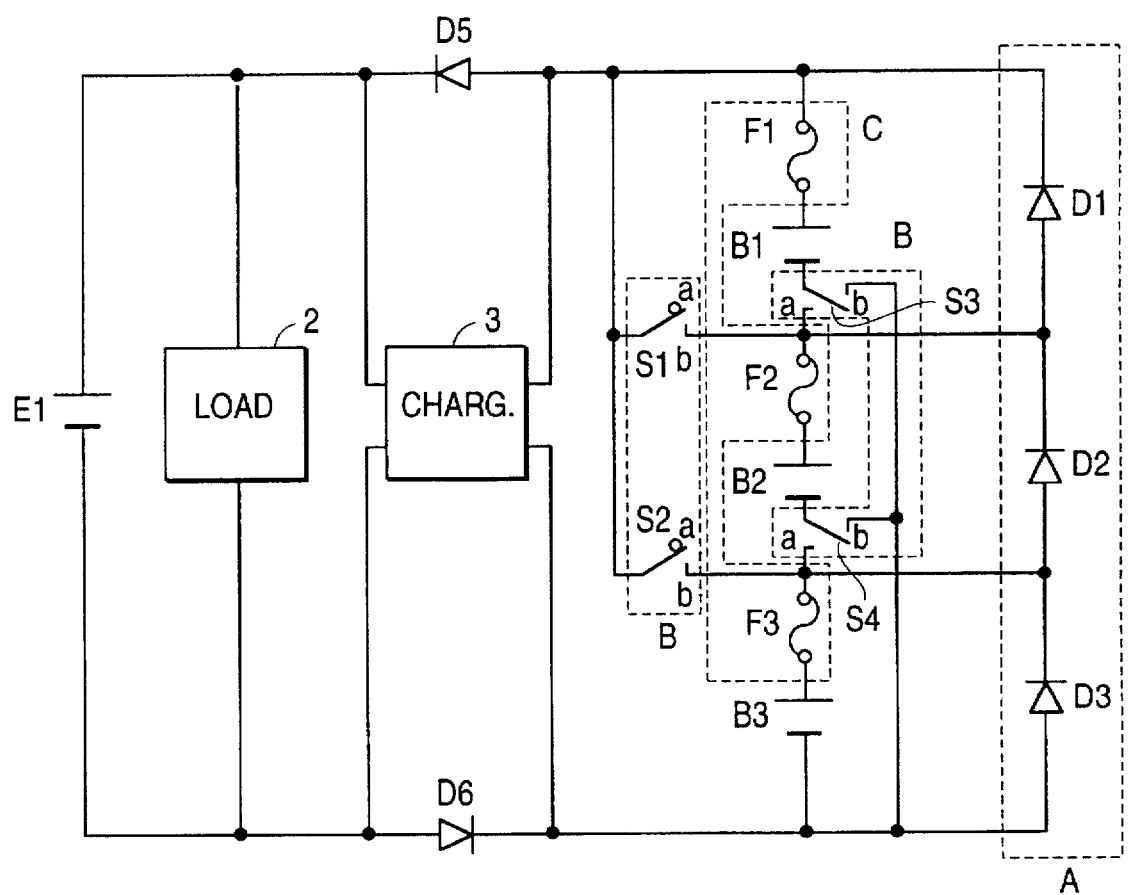
FIG. 3 is a circuit diagram of a battery charging/discharging apparatus in accordance with a second embodiment of the present invention.
Figure 4:
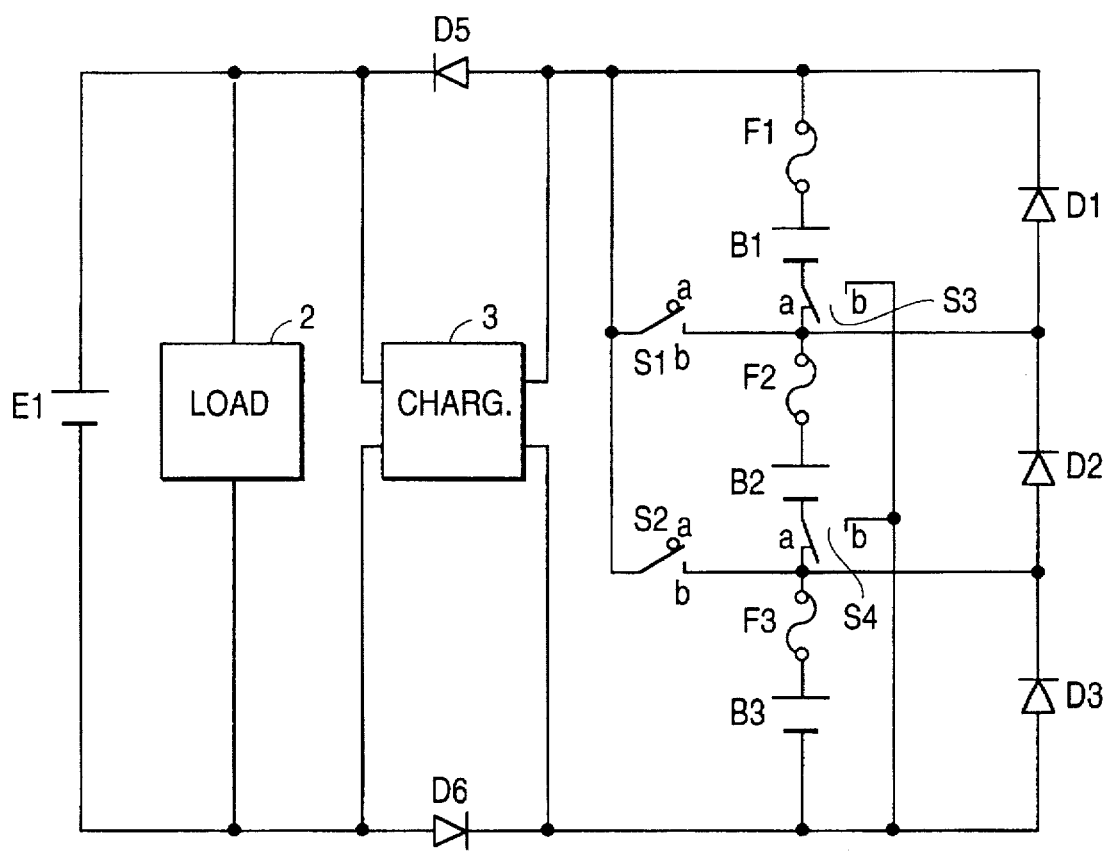
FIG. 4 is a circuit diagram for explaining the discharging operation of the second embodiment of FIG. 3.
Figure 5:
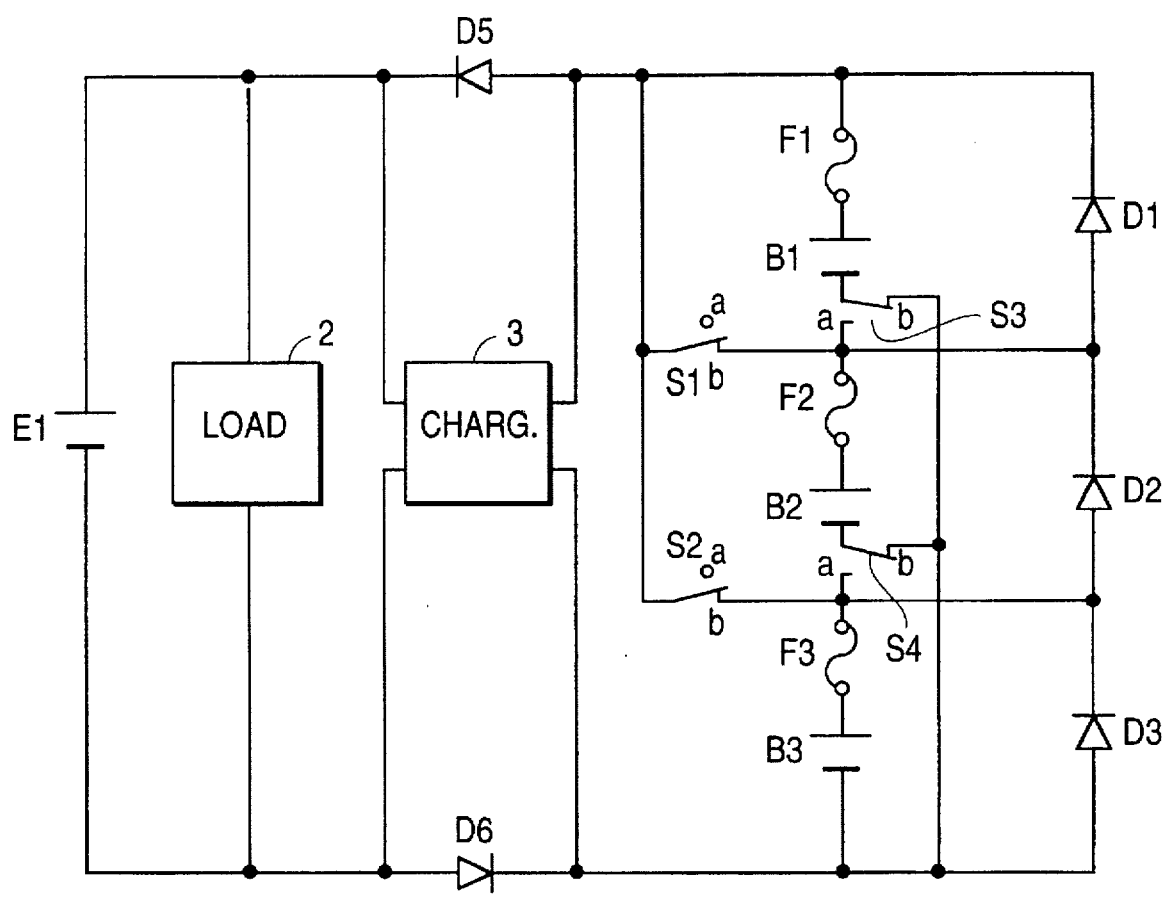
FIG. 5 is a circuit diagram for explaining the charging operation of the second embodiment of FIG. 3.

Referring to FIGS. 3–5 which are used to illustrate the second embodiment of the present invention, the elements which are the same as those in FIG. 1 and FIG. 2 are designated by the same reference numerals or symbols. The second embodiment also includes switches S1–S4, terminals a and b, fuses F1–F3, a diode part A, a switch part B and a fuse part C.

In accordance with the second embodiment, the charger 3 charges the batteries B1–B3 with the input power supply E1 supplying electrical power to the load 2. The diodes D5 and D6 supply the power to the load 2 from the batteries B1–B3 when the input power supply E1 fails.

The batteries B1–B3 are rechargeable batteries, such as lead storage batteries or nickel-cadmium storage batteries. The diode section A is formed of three diodes D1–D3 which are connected in parallel with the batteries B1–B3 while the batteries B1–B3 are being discharged.

The switch section B is formed of four switches S1–S4, each of which is provided with terminals a and b operating as changeover contacts. The movable portion of each of switches S1–S4 is connected to terminal a when the batteries B1–B3 are being discharged and to terminal b when the batteries B1–B3 are being charged.

The fuse section C is formed of three fuses F1–F3 which form a short-circuit for the batteries B1–B3 during the charging operation and also open the circuit if an overcurrent flows during the charging operation.

The discharging of the batteries B1–B3 is explained with reference to FIG. 4. If the input power supply E1 fails, such power failure is detected and the movable portions of the switches S1–S4 of the switch section B are connected to the terminal a. As a result, the backup power supply is supplied to the load 2 through the diode D6, battery B3, fuse F3, terminal a of the switch S4, battery B2, fuse F2, terminal a of the switch S3, battery B1, fuse F1, and diode D5.

If a failure occurs because one of the batteries, for example, the battery B2, becomes open when the batteries B1–B3 are supplying electrical power to the load 2, the backup supply of electrical power is provided to the load through the diode D6, battery B3, fuse F3, diode D2, terminal a of switch S3, battery B1, fuse F1 and diode D5. Therefore, even if a failure occurs because one of the plurality of batteries opens, a voltage reduced by the voltage corresponding to one battery is supplied, so that backup power can be supplied continuously. Moreover, the defective battery can be replaced with a normal battery during the backup power supply operation.

A charging operation for charging the batteries B1–B3 will be explained below with reference to FIG. 5. When the electrical power is supplied to the load 2 from the input power supply E1, the supply of input power is detected and the movable contacts of the switches S1–S4 of the switch section are connected to the terminal b. As a result, when electrical power is supplied to the charger 3 from the input power supply E1 connected to the load 2, charging of the batteries B1–B3 is carried out from the charger 3 via the fuse F1, battery B1 and terminal b of the switch S3. Charging is also carried out via terminal b of the switch S1, fuse F2, battery B2 and terminal b of the switch S4. Charging is also carried out via terminal b of the switch S2, fuse F3 and battery B3. As a result of this structure, even if one of the batteries, for example, the battery B2, becomes open during the charging operation since the batteries B1–B3 are connected in parallel to the output of the charger 3, the batteries B1 and B2 can be charged.

If one of the batteries, for example, the battery B2, is short-circuited during the charging operation, a short circuit is formed through the charger 3, contact b of the switch S4, battery B2, fuse F2 and contact b of the switch S1. An overcurrent flows through the short-circuit and the fuse F2 is opened by the overcurrent. As a result, the defective battery B2 is disconnected from the charging circuit by the fuse F2, while the batteries B1 and B3 continue to be charged.

The preferred embodiments of the present invention have been explained above, but the present invention can also be implemented in alternate ways as explained below.

In the preferred embodiments, the input power supply E1 to the load 2 also supplies power to the charger 3. It is also possible to use a charger (AC/DC converter) to smooth AC power as the power supply to the charger.

Changeover of the terminals a and b of the switches S1–S4 can be done automatically by detecting the supply condition of the input power supply E1. Moreover, these switches S1–S4 may be replaced with electronic switches such as a bipolar transistor, an FET, etc., in place of the illustrated mechanical switches.

In the preferred embodiments, three batteries are illustrated, but the present invention can be used with two or more batteries.

As described above, the present invention provides the following advantages. Even if a failure occurs because one of a plurality of batteries becomes open, the remaining normal batteries can be continuously charged or discharged. Moreover, even if one battery is short-circuited, the remaining normal batteries can be charged or discharged by disconnecting the defective battery by blowing the fuse.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to as falling within the scope of the invention in the appended claims and their equivalents.

What is claimed is:

1. A battery charging/discharging apparatus for a plurality of batteries, comprising:

a charger coupled to the plurality of batteries, to charge the plurality of batteries;

fuses respectively connected to the plurality of batteries; and switches coupled to the plurality of batteries to connect the batteries in a parallel connection with said charger for charging, so that the fuses are connected in a parallel connection with the charger, and each fuse and corresponding battery are connected in a serial connection with the charger, and to connect the batteries in a serial connection for discharging.

2. A battery charging/discharging apparatus according to claim 1, further comprising diodes respectively connected in parallel with the plurality of batteries, each of said diodes having a cathode connected to a positive side of a corresponding one of the batteries and having an anode connected to a negative side of the corresponding one of the batteries.

* * * * *

UNITED STATES PATENT AND TRADEMARK OFFICE
CERTIFICATE OF CORRECTION

PATENT NO. :   5,747,966
DATED      :   May 5, 1998
INVENTOR(S) :  MINAMOTO

It is certified that error appears in the above-identified patent and that said Letters Patent is hereby corrected as shown below:

TITLE PAGE: [73] Assignee: Change "Kanagawa" to --Kawasaki--.

Signed and Sealed this

Eleventh Day of January, 2000

Attest:

Q. TODD DICKINSON

*Attesting Officer*          *Acting Commissioner of Patents and Trademarks*